(12) United States Patent
Park et al.

(10) Patent No.: US 8,625,088 B2
(45) Date of Patent: Jan. 7, 2014

(54) INTEGRATING SPHERE PHOTOMETER AND MEASURING METHOD OF THE SAME

(75) Inventors: Seongchong Park, Daejeon (KR); Dong Hoon Lee, Daejeon (KR); Seung Nam Park, Daejeon (KR)

(73) Assignee: Korean Research Institute of Standards and Science, Daejeon (KR)

( * ) Notice: Subject to any disclaimer, the term of this patent is extended or adjusted under 35 U.S.C. 154(b) by 0 days.

(21) Appl. No.: 13/511,220

(22) PCT Filed: Feb. 2, 2010

(86) PCT No.: PCT/KR2010/000611
§ 371 (c)(1),
(2), (4) Date: May 22, 2012

(87) PCT Pub. No.: WO2011/068281
PCT Pub. Date: Jun. 9, 2011

(65) Prior Publication Data
US 2012/0229801 A1    Sep. 13, 2012

(30) Foreign Application Priority Data

Dec. 1, 2009 (KR) .......................... 10-2009-0117715

(51) Int. Cl.
*G01J 1/42* (2006.01)
(52) U.S. Cl.
USPC ........................... 356/236; 356/326; 250/228
(58) Field of Classification Search
USPC .................................. 356/236, 326; 250/228
See application file for complete search history.

(56) References Cited

U.S. PATENT DOCUMENTS

| 5,258,363 | A | * | 11/1993 | Hed | 505/160 |
| 5,359,406 | A | * | 10/1994 | Suzuki | 356/236 |
| 5,745,234 | A | * | 4/1998 | Snail et al. | 356/236 |
| 8,451,438 | B2 | * | 5/2013 | Park et al. | 356/236 |
| 2008/0204884 | A1 | * | 8/2008 | Jang | 359/599 |
| 2013/0099102 | A1 | * | 4/2013 | Park et al. | 250/208.2 |

FOREIGN PATENT DOCUMENTS

| JP | 3233338 | 10/1991 |
| JP | 5302852 | 11/1993 |
| JP | 5312639 | 11/1993 |
| JP | 2008076126 | 4/2008 |
| KR | 20-0304586 | 2/2003 |

* cited by examiner

*Primary Examiner* — Hoa Pham
(74) *Attorney, Agent, or Firm* — Sherr & Jiang, PLLC

(57) ABSTRACT

Provided are an integrating sphere photometer and a measuring method of the same. The integrating sphere photometer includes an integrating sphere including a left hemisphere and a right hemisphere, a photometer disposed on the center surface of the right hemisphere, a photometer baffle disposed in front of the photometer to be spaced apart therefrom, a light source to be tested disposed at the center region of the integrating sphere to illuminate light to at least an illumination region of the left hemisphere, an auxiliary lamp part disposed in the vicinity of a contact region between the left hemisphere and the right hemisphere to illuminate light to the illumination region, and an auxiliary lamp baffle disposed around the auxiliary lamp part to prevent the light emitted from the light source to be tested from being directly illuminated to the auxiliary lamp part and also to prevent the light emitted from the auxiliary lamp part from being directly illuminated to the light source to be tested.

7 Claims, 5 Drawing Sheets

INTEGRATING SPHERE PHOTOMETER AND MEASURING METHOD OF THE SAME

CROSS REFERENCE TO PRIOR APPLICATIONS

This application is a National Stage Patent Application of PCT International Patent Application No. PCT/KR2010/000611 (filed on Feb. 2, 2010) under 35 U.S.C. §371, which claims priority to Korean Patent Application No. 10-2009-0117715 (filed on Dec. 1, 2009), which are all hereby incorporated by reference in their entirety.

TECHNICAL FIELD

The present invention relates to apparatuses for measuring a total luminous flux [unit: 1 m] using an integrating sphere and a photometer and, more specifically, to an integrating photometer which can be applied even to a flat surface light source that has a size of tens of centimeters or greater and emits light only in a specific direction, hemispherically as well as small-sized conventional light sources.

BACKGROUND ART

Total luminous flux is one of the key parameters describing the net lighting performance of a light source, which is defined as the sum of luminous flux [unit: 1 m] emitted by a light source in all directions. For example, luminous efficacy [unit: 1 m/W] is evaluated based on the total luminous flux, which is determined as a ratio of an output total luminous flux [unit: 1 m] to an input electrical power [unit: W]. Accordingly, accurate measurement of a total luminous flux is very important in evaluating the performance of lighting apparatuses.

In general, the measurement of a total luminous flux is made by a gonio-photometer. After measuring the spatial distribution of an output luminous intensity over $4\pi$ solid angle using a reference photometer of which luminous intensity responsivity has been calibrated, the total luminous flux is obtained by mathematically integrating the luminous intensity distribution.

Alternatively, the measurement of a total luminous flux can be made by an integrating sphere photometer. In principle, the integrating sphere photometer structurally integrates the luminous flux inside the integrating sphere, and gives an output signal nearly proportional to the total luminous flux value of an light source inside the integrating sphere. Since the integrating sphere photometer utilizes the proportionality, the measurement is performed by comparing a light source to be tested with a reference lamp of which total luminous flux has been calibrated. The integrating sphere photometer is advantageous in simple structure and short measuring time.

In the case that a reference lamp and a light source to be tested are identical in kind, the integrating sphere photometer may easily obtain a highly accurate total luminous flux through a simple comparison measurement. Due to this advantage, the integrating sphere photometer has been widely used in practical works.

However, in the case that a reference lamp and a light source to be tested are different in shape, spectral distribution, and spatial distribution, all the differences make measurement errors. To alleviate the errors, the integrating sphere photometer must be additionally subjected to a correction step. The correction step may include self-absorption mismatch correction, spectral mismatch correction, and spatial mismatch correction.

A reference lamp is used for comparison measurement at the integrating sphere photometer. An incandescent lamp has been conventionally used as the reference lamp. The correction step for a light source to be tested, which is not very different in shape and size from the reference lamp, is already well known in the art.

However, in the case that the light source to be tested is a large area surface light source, self-screening effect may occur to cause difficulty in measuring the total luminous flux using the integrating sphere photometer.

DISCLOSURE OF INVENTION

Solution to Problem

Embodiments of the present invention provide an integrating sphere photometer and a measuring method of the same. The integrating sphere photometer may include an integrating sphere including a left hemisphere and a right hemisphere, a photometer disposed on the center surface of the right hemisphere, a photometer baffle disposed in front of the photometer to be spaced apart therefrom, a light source to be tested disposed at the center region of the integrating sphere to illuminate light to at least an illumination region of the left hemisphere, an auxiliary lamp part disposed in the vicinity of a contact region between the left hemisphere and the right hemisphere to illuminate light to the illumination region, and an auxiliary lamp baffle disposed around the auxiliary lamp part to prevent the light emitted from the light source to be tested from being directly illuminated to the auxiliary lamp part and also to prevent the light emitted from the auxiliary lamp from being directly illuminated to the the light source to be tested. The auxiliary lamp may have various degree of angular directionality in itself as uniform as a point source to as highly narrow as a laser.

According to an example embodiment, the auxiliary lamp part may include an auxiliary lamp disposed inside the integrating sphere and a reflection cup disposed adjacent to the auxiliary lamp to provide directionality to the auxiliary lamp.

According to an example embodiment, the auxiliary lamp part may further include an align unit aligning at least one of the auxiliary lamp and the reflection cup by moving the same such that light is illuminated to the illumination region.

According to an example embodiment, the auxiliary lamp part may include an auxiliary lamp disposed outside the integrating sphere, a lens focusing an output light of the auxiliary lamp, an optical transfer unit having one end disposed inside the integrating sphere and transferring the light focused by the lens, and an aperture providing directionality to the light output by the optical transfer unit.

According to an example embodiment, the auxiliary lamp part may include an auxiliary lamp disposed outside the integrating sphere, a lens focusing output light of the auxiliary lamp and an optical transfer unit having one end disposed inside the integrating sphere and transferring the light focused by the lens. The auxiliary lamp baffle may provide directionality to the light output from the one end of the optical transfer unit.

According to an example embodiment, the auxiliary lamp part may include a plurality of auxiliary lamp parts disposed at a contact region between the left hemisphere and the right hemisphere. An outermost region of the region illuminated by the auxiliary lamp parts may match the illumination region.

Embodiments of the present invention also provide a measuring method of an integrating sphere photometer including an integrating sphere comprising a left hemisphere and a right hemisphere, a photometer disposed on the center surface of the right hemisphere, a photometer baffle disposed in front of the photometer to be spaced apart therefrom, a light source to be tested disposed at the center region of the integrating sphere to illuminate light to at least an illumination region of the left hemisphere, a auxiliary lamp part disposed in the vicinity of a contact region between the left hemisphere and the right hemisphere to illuminate light to the illumination region, and an auxiliary lamp baffle disposed around the auxiliary lamp part to prevent the light emitted from the light source to be tested from being directly illuminated to the auxiliary lamp part and also to prevent the light emitted from the auxiliary lamp from being directly illuminated from the light source to be tested. The measuring method may include mounting a reference lamp on the center region of the integrating sphere and lighting the reference lamp to measure incident light by the photometer, putting out the light of the reference lamp and lighting the auxiliary lamp part to measure incident light by the photometer, removing the reference lamp and mounting and lighting the light source to be tested to measure incident light by the photometer, putting out the light of the light source to be tested and lighting the auxiliary lamp part to measure incident light by the photometer, and calculating the total luminous flux of the measuring target light source. The reference lamp may have various angular distribution uniform angular distribution over $4\pi$-solid angle, uniform angular distribution over $2\pi$-solid angle for the right hemisphere and 0-intensity for the left hemisphere, or lambertian angular distribution over $2\pi$-solid angle for the right hemisphere and 0-intensity for the left hemisphere.

Advantageous Effects of Invention

According to the present invention, an integration sphere photometer is provided with an auxiliary lamp for error correction to effectively correct errors caused by self-absorption and self-screening effect, which arise when the total luminous flux of a surface light source is measured, even when an incandescent lamp-type reference lamp is used. Moreover, the integrating sphere photometer may be used to measure not only a specific surface light source but also various sizes and shapes of light sources.

MODE FOR THE INVENTION

There is a requirement for an integrating sphere photometer which is capable of measuring the total luminous flux of a surface-type of a light source to be tested and which is not different in function from a conventional integrating sphere photometer using a reference lamp. The integrating sphere photometer needs to remove a measurement error caused by self-screening effect.

The present invention will now be described more fully hereinafter with reference to the accompanying drawings, in which preferred embodiments of the present invention are shown. However, the present invention may be embodied in many different forms and should not be construed as limited to the embodiments set forth herein. Rather, these embodiments are provided so that this disclosure will be thorough and complete, and will fully convey the scope of the present invention to those skilled in the art. Like numbers refer to like elements throughout.

Figure 1:
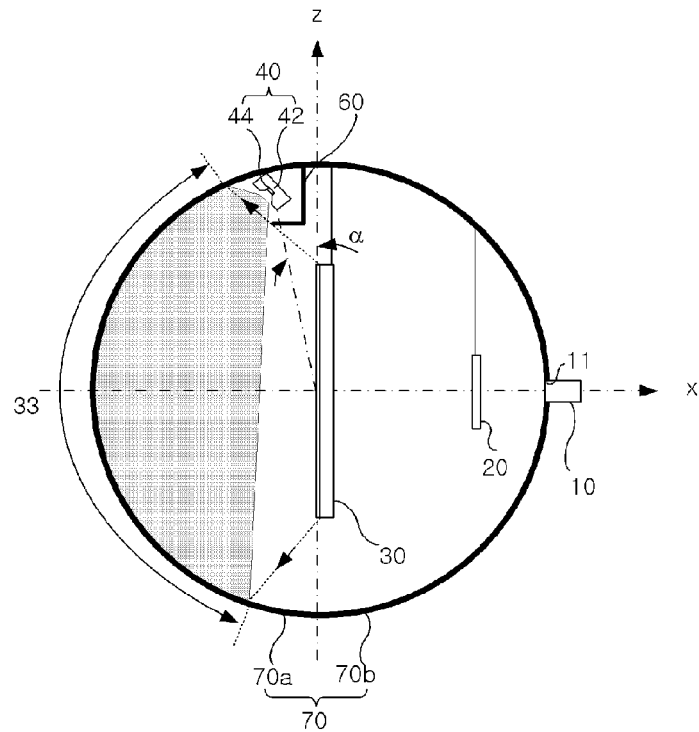
FIG. 1 is a cross-sectional view illustrating an integrating sphere photometer according to an embodiment of the present invention.
Figure 2:
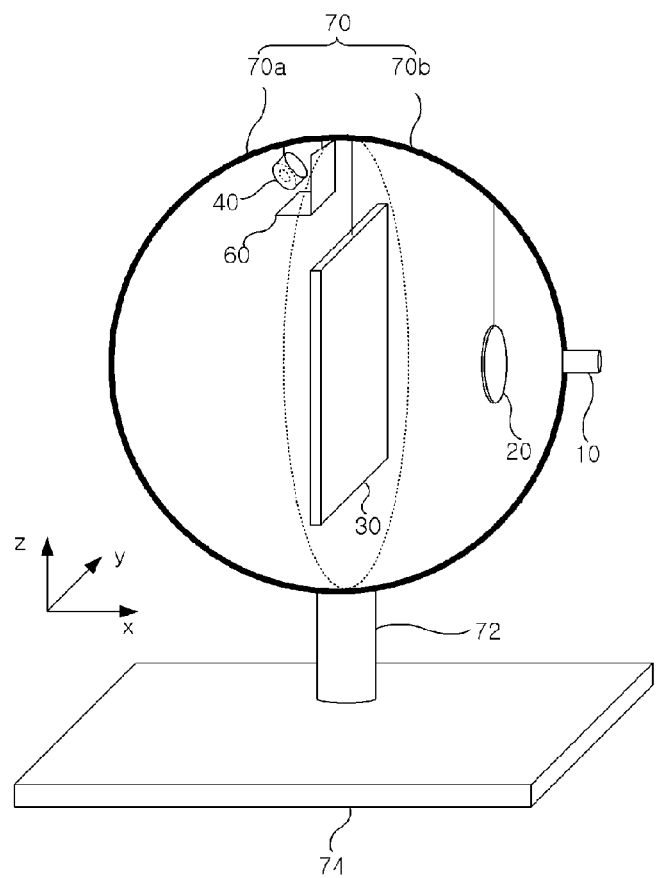
FIG. 2 is a perspective view illustrating an integrating sphere photometer according to an embodiment of the present invention.

FIG. 1 is a cross-sectional view illustrating an integrating sphere photometer according to an embodiment of the present invention, and FIG. 2 is a perspective view illustrating an integrating sphere photometer according to an embodiment of the present invention.

Referring to FIGS. 1 and 2, the integrating sphere photometer includes an integrating sphere 70 comprising a left hemisphere 70a and a right hemisphere 70b, photometer 10 disposed on the center surface of the right hemisphere 70b, a photometer baffle 20 disposed in front of the photometer 10 to be spaced apart therefrom, a light source to be tested 30 disposed at the center region of the integrating sphere 70 to illuminate light to at least an illumination region 33 of the left hemisphere 70a, a auxiliary lamp part 40 disposed in the vicinity of a contact region between the left hemisphere 70a and the right hemisphere 70b to illuminate light to the illumination region 33, and an auxiliary lamp baffle 60 disposed around the auxiliary lamp part 40 to prevent the light emitted from the light source to be tested 30 from being directly illuminated to the auxiliary lamp part 40 and also to prevent the light emitted from the auxiliary lamp part 40 from being directly illuminated to the light sourced to be tested 30.

The integrating sphere 70 may have a diameter ranging from tens of centimeters to several meters. Reflectance R of an inner circumferential surface of the integrating sphere 70 may be 90 percent or more. The inner circumferential surface of the integrating sphere 70 may be a substantially spherical surface. It is not meant that the left hemisphere 70a and the right hemisphere are divided into each other. The integrating sphere 70 may comprise a plurality of parts which are removably coupled with each other. The integrating sphere 70 may be supported by a support 72, which may be fixedly coupled with a frame 74.

The photometer 10 provides an output signal which is proportional to illuminance on the front surface of the photometer 10, based on the principle that an electrical signal when photons reach the photometer 10 is generated. The photometer 10 may be inserted into a through hole 11 disposed at the center surface of the right hemisphere 70a or may be disposed on the back of the through hole 11.

The photometer baffle 20 may prevent light emitted from the light source to be tested 30 or a reference lamp (not shown) from directly impinging on the photometer 10. The photometer baffle 20 may be disc-shaped. Reflectance of the photometer baffle 20 may be 90 percent or more. Axes of the photometer baffle 20 and the photometer 10 are coaxial with each other. A diameter of the photometer baffle 20 may be greater than that of the photometer 10 or the through hole 11 or large enough to fully screen the light from the reference source (not shown) and the light source to be tested 30 to the photometer 10.

The light source to be tested 30 may be a small-sized, point-like light source or a surface light source. Preferably, the light source to be tested 30 is a surface light source. The light source to be tested 30 may be a surface light source such as a backlight unit for a flat panel display which has a size of tens of centimeters and a flat shape and emits light by covering only $2\pi$-solid angle, that is, only a hemisphere.

In case of the surface light source, error correction cannot be performed by means of a conventional integrating sphere photometer. When the surface light source is mounted in a conventional integrating sphere photometer, it may function as a light screening baffle of low reflectance in itself. Accordingly, self-screening effect occurs to prevent smooth redistribution of light inside the integrating sphere. As a result, conditions of the integrating sphere photometer become different from those when a reference lamp signal is measured. The larger the size of the surface light source to be tested, the greater the error. To remove the error, comparison measurement must be performed using a reference lamp of the same shape as the surface light source to be tested. However, it is practically impossible to provide a reference lamp well-matched for every light source to be tested. In practical works, advantages of the integrating sphere photometer are abandoned and a surface light source is measured by means of a goniophotometer that is relatively complex and requires long measuring time. The goniophotometer requires high cost and a space capable of providing a measuring distance of 10 meters or longer to measure a surface light source having a size of tens of centimeters.

The auxiliary lamp part 40 may include an auxiliary lamp 42 and a reflection cup 44.

The auxiliary lamp 42 may include at least one of a tungsten halogen lamp, a deuterium arc lamp, a Globar lamp, a helium-neon laser, a laser diode, and a white LED. The auxiliary lamp may have various degree of angular directionality in itself as uniform as a point source to as highly narrow as a laser. The reflection cup 44 may provide a directionality to output light of the correction light source 42. That is, the auxiliary lamp 40 may be provided to illuminate the illumination region 33 illuminated by lighting the light source to be tested 30. If the auxiliary lamp part 40 is installed to illuminate the illumination region 33, the auxiliary lamp part 40 may provide a correction considering not only an error caused by self-absorption mismatch but also an error caused by self-screening effect at the light source to be tested 30. When the auxiliary lamp part 40 is lit, a substantially identical hemispherical surface is established by an inner surface of the integrating sphere 70 to which light of the auxiliary lamp part 40 runs directly and an inner surface of the integrating sphere 40 to which light of the light source to be tested 30 runs directly. Thus, the screening effect of the light source to be tested on a signal of a photometer through internal reflection of the integrating sphere 70 are identical to each other.

In order to minimize screening light emitted from the light source to be tested 30 by the auxiliary lamp baffle 60 and cover light over the illumination region 33, the auxiliary lamp part 40 must be disposed at a contact area between the left hemisphere 70a and the right hemisphere 70b. Preferably, an angle "a" between a direction of the auxiliary lamp part 40 and the central axis of the integrating sphere 70 may be 10 degrees or less.

Figure 3:
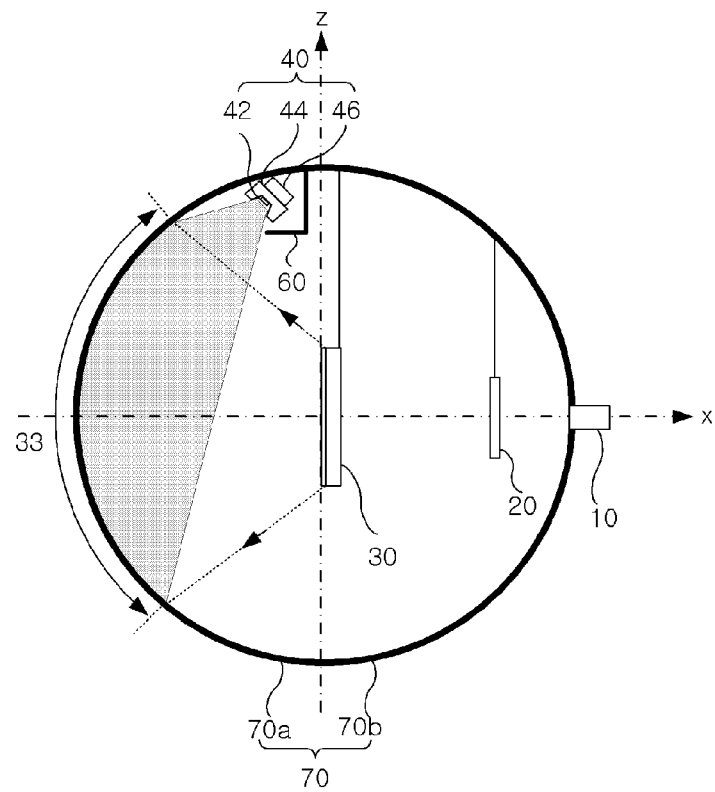
FIGS. 3 to 6 illustrate integrating sphere photometers according to other embodiments of the present invention.

FIG. 3 illustrates an integrating sphere photometer according to another embodiment of the present invention. The same parts as explained in FIGS. 1 and 2 will be omitted herein to avoid duplicate explanations.

Referring to FIGS. 1 and 3, a auxiliary lamp part 40 may further include an align unit 46 which aligns at least one of the auxiliary lamp 42 and the reflection cup 44 by moving the same such that light is illuminated to the illumination region 33.

The align unit 46 may adjust a distance between the reflection cup 44 and the auxiliary lamp 44 or a position of the auxiliary lamp 44. Thus, the align unit 46 may control the auxiliary lamp part 40 to accurately aim light on the illumination region 33.

Figure 4:
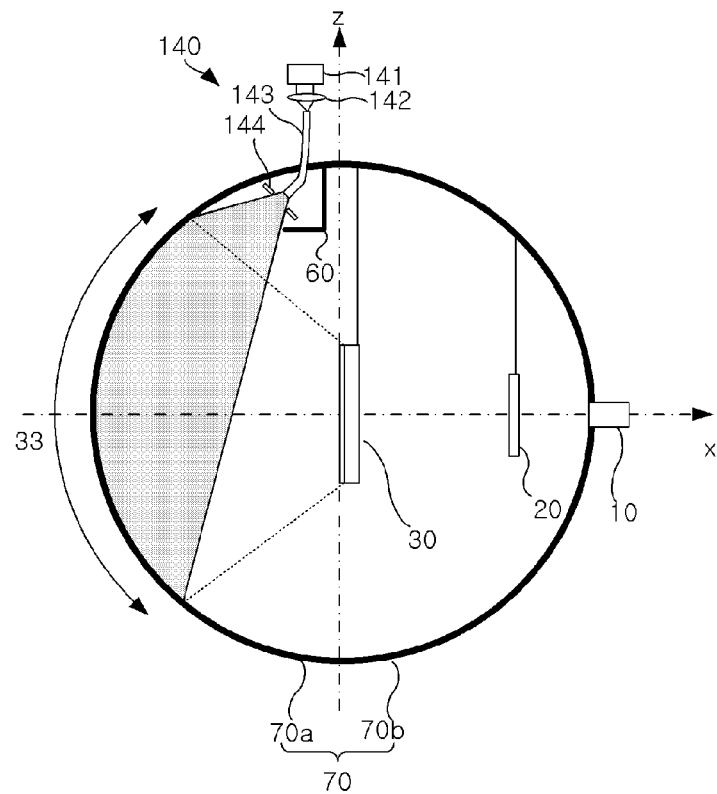

FIG. 4 illustrates an integrating sphere photometer according to another embodiment of the present invention. The same parts as explained in FIGS. 1 and 2 will be omitted herein to avoid duplicate explanations.

Referring to FIG. 4, an auxiliary lamp part 140 includes a auxiliary lamp 141 disposed outside the integration sphere 70, a lens 142 focusing output light of the auxiliary lamp 141, an optical transfer unit 143 having one end disposed inside the integrating sphere 70 and transferring the light focused by the lens 142, and an aperture 144 providing directionality to the light output by the optical transfer unit 143.

The auxiliary lamp 141 may include at least one of a tungsten halogen lamp, a deuterium arc lamp, a Globar lamp, a helium-neon laser, a laser diode, and a white LED. The auxiliary lamp may have various degree of angular directionality in itself as uniform as a point source to as highly narrow as a laser.

The lens 142 may focus output light of the light source 142 and transfer the focused light to the optical transfer unit 143. The optical transfer unit 143 may be an optical fiber or a bundle of optical fibers. The optical fiber 143 may be a multimode optical fiber. An internal diameter of the aperture 144 and a distance between the aperture 144 and the one end of the optical transfer unit 143 may provide directionality. The distance between the aperture 144 and the one end of the optical transfer unit 143 may be adjusted.

Figure 5:
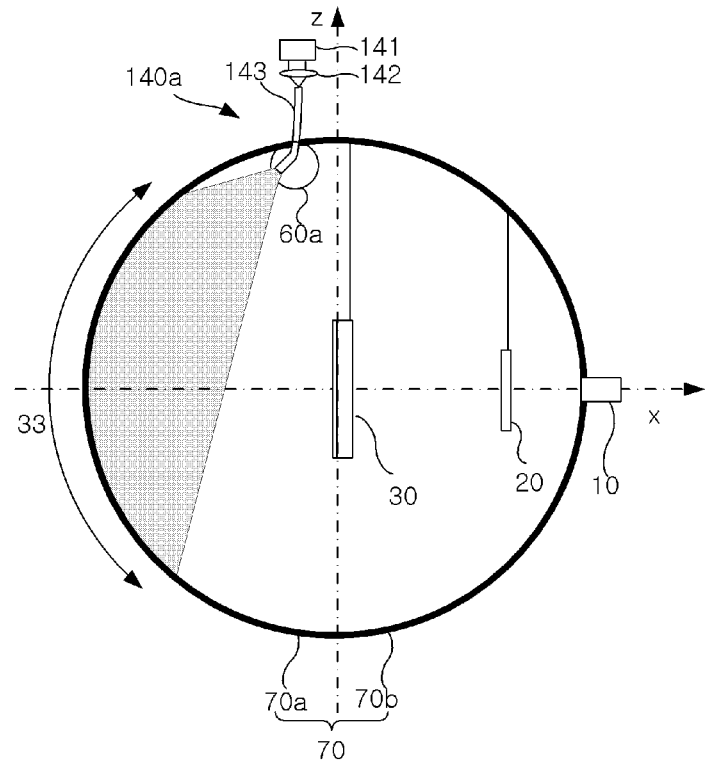

FIG. 5 illustrates an integrating sphere photometer according to another embodiment of the present invention. The same parts as explained in FIGS. 1 and 2 will be omitted herein to avoid duplicate explanations.

Referring to FIG. 5, an auxiliary lamp part 140a may include an auxiliary lamp 141 disposed outside the integrating sphere 70, a lens 142 focusing output light of the auxiliary lamp 141, and an optical transfer unit 143 having one end disposed inside the integrating sphere 70 and transferring the light focused by the lens 142.

An auxiliary lamp baffle 60a provides directionality to light output from the one end of the optical transfer unit 143.

Figure 6:
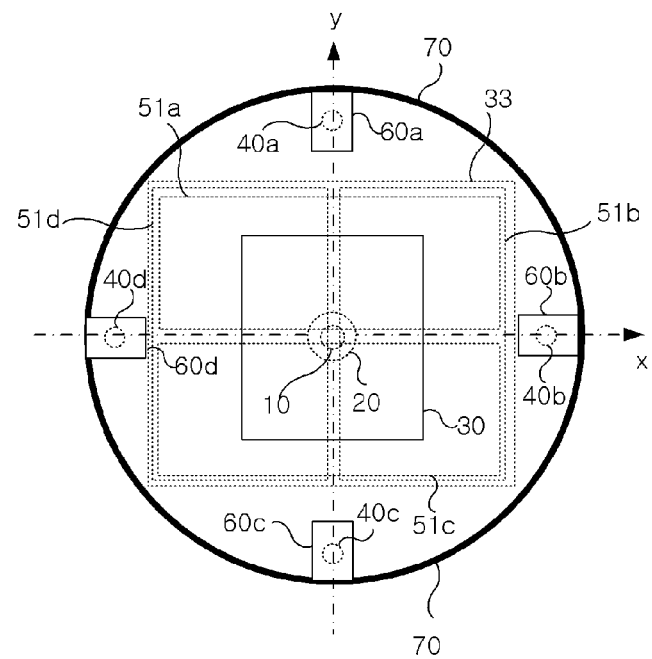

FIG. 5 illustrates an integrating sphere photometer according to another embodiment of the present invention. The same parts as explained in FIGS. 1 and 2 will be omitted herein to avoid duplicate explanations. FIG. 6 is a diagram viewed from the x-y plane in FIG. 2.

Referring to FIG. 6, an auxiliary lamp part may include a plurality of auxiliary lamp parts 40a~40d. The auxiliary lamp parts 40a~40d may be arranged at a contact region between the left hemisphere and the right hemisphere. An outermost region of the region illuminated by the auxiliary lamp parts 40a~40d may match the illumination region 33. The auxiliary lamp baffles may include first to fourth auxiliary lamp baffles 60a~60d.

More specifically, the auxiliary lamp parts may include first to fourth auxiliary lamp parts 40a~40d by which sub-illumination regions 51a~51d may be formed, respectively. An outermost region of the sub-illumination regions 51a~51d may substantially match the illumination region 33.

A procedure for error correction of an integrating sphere photometer will now be described below.

FIGS. 7 to 10 illustrate a measuring method of an integrating sphere photometer according to an embodiment of the present invention.

Figure 7:
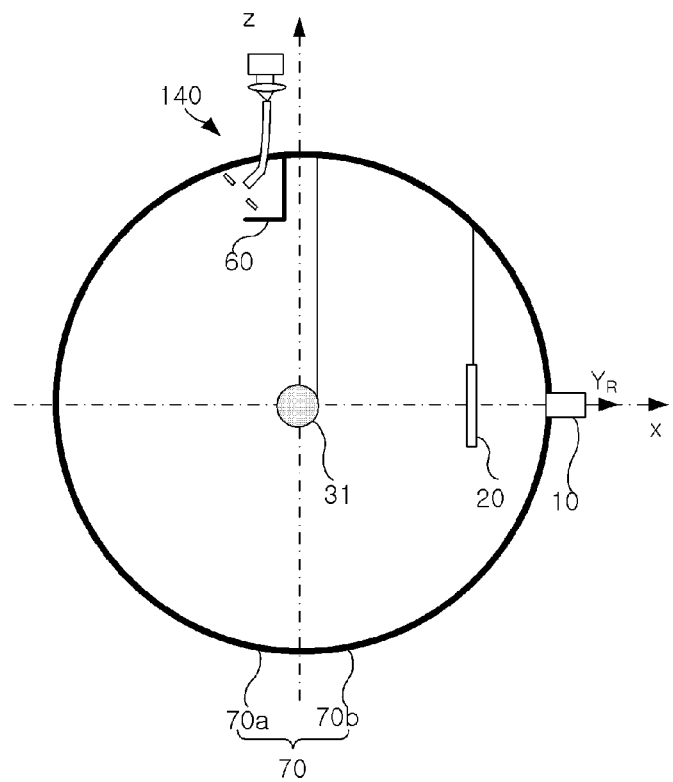
FIGS. 7 to 10 illustrate a measuring method of an integrating sphere photometer according to an embodiment of the present invention.

Referring to FIG. 7, an integrating sphere photometer includes an integrating sphere 70 comprising a left hemisphere 70a and a right hemisphere 70b, photometer 10 disposed on the center surface of the right hemisphere 70b, a photometer baffle 20 disposed in front of the photometer 10 to be spaced apart therefrom, a light source to be tested 30 disposed at the center region of the integrating sphere 70 to illuminate light to at least an illumination region 33 of the left hemisphere 70a, a auxiliary lamp part 140 disposed in the vicinity of a contact region between the left hemisphere 70a and the right hemisphere 70b to illuminate light to the illumination region 33, and an auxiliary lamp baffle 60 disposed around the auxiliary lamp part 140 to prevent the light emitted from the light source to be tested 30 from being directly illuminated to the auxiliary lamp part 140 and also prevent the light emitted from the auxiliary lamp part 140 from being directly illuminated to the light source to be tested 30.

A reference lamp 31 is mounted on the center region of the integrating sphere 70. Next, the reference lamp 31 is lit and the photometer 10 measures incident light to output an output signal $Y_R$. It is assumed that a reference value of the total luminous flux of the reference lamp 31 is denoted as $\Phi_R$.

Figure 8:
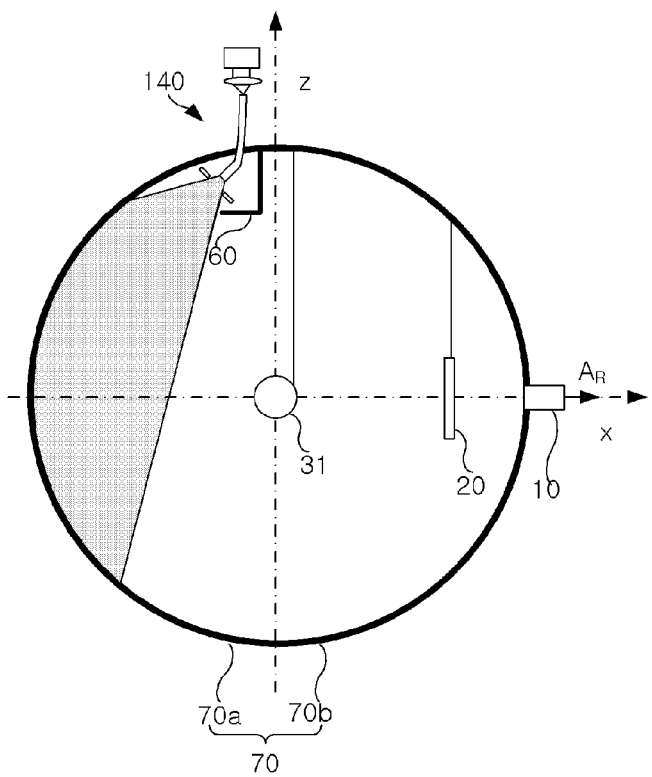

Referring to FIG. 8, the light of the reference lamp 31 is put out and the auxiliary lamp part 140 is lit. The photometer 10 measures incident light to output an output signal $A_R$.

Figure 9:
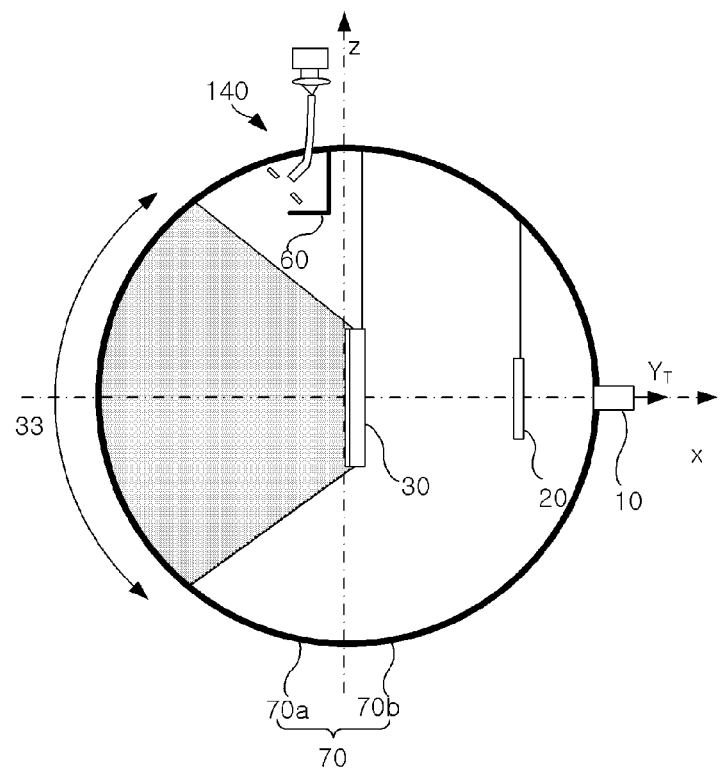

Referring to FIG. 9, the reference lamp 31 is removed, and the light source to be tested 30 is mounted and lit. The photometer 10 measure incident light to output an output signal $V_T$.

Figure 10:
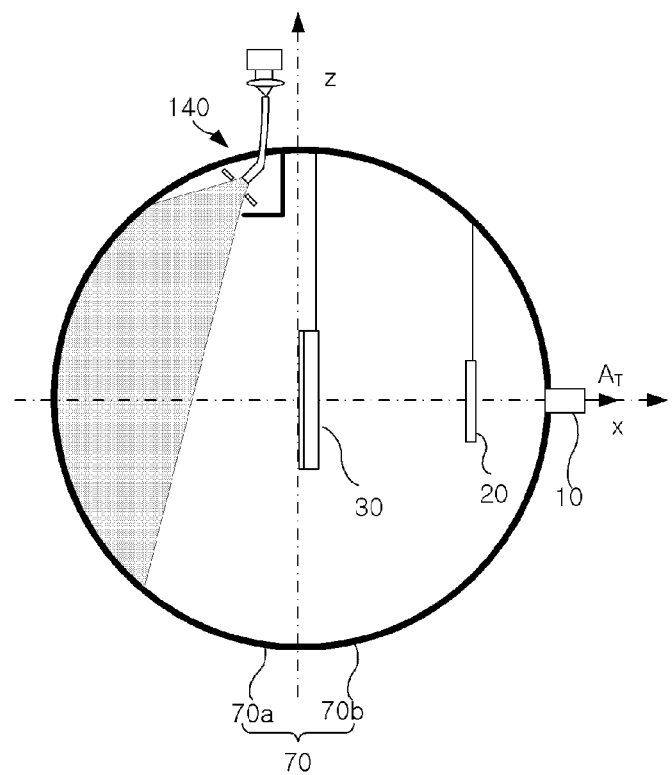

Referring to FIG. 10, the light of the light source to be tested 30 is put out and the auxiliary lamp part 140 is lit. The photometer 10 measures incident light to output an output signal $A_T$.

The total luminous flux $\Phi_T$ of the light source to be tested 30 is calculated as given by equation below:

MathFigure 1

$$\Phi_T = \left(\frac{Y_T}{Y_R}\right)\left(\frac{A_R}{A_T}\right)\Phi_R \quad \text{[Math. 1]}$$

Although the present invention has been described in connection with the embodiment of the present invention illustrated in the accompanying drawings, it is not limited thereto. It will be apparent to those skilled in the art that various substitutions, modifications and changes may be made without departing from the scope and spirit of the invention.

The invention claimed is:

1. An integrating sphere photometer comprising:
   an integrating sphere including a left hemisphere and a right hemisphere;
   a photometer disposed on the center surface of the right hemisphere;
   a photometer baffle disposed in front of the photometer to be spaced apart therefrom;
   a light source to be tested disposed at the center region of the integrating sphere to illuminate light to at least an illumination region of the left hemisphere;
   an auxiliary lamp part disposed in the vicinity of a contact region between the left hemisphere and the right hemisphere to illuminate light to the illumination region; and
   an auxiliary lamp baffle disposed around the auxiliary lamp part to prevent the light emitted from the light source to be tested from being directly illuminated to the auxiliary lamp part and also to prevent the light emitted from the auxiliary lamp part from being directly illuminated to the light source to be tested,
   wherein an outermost region of the region illuminated by the auxiliary lamp part matches the illumination region.

2. The integrating sphere photometer as set forth in claim 1, wherein the auxiliary lamp part comprises:
   an auxiliary lamp disposed inside the integrating sphere; and
   a reflection cup disposed adjacent to the auxiliary lamp to provide directionality to the auxiliary lamp.

3. The integrating sphere photometer as set forth in claim 2, wherein the auxiliary lamp part further comprises:
   an align unit aligning at least one of the auxiliary lamp and the reflection cup by moving the same such that light is illuminated to the illumination region.

4. The integrating sphere photometer as set forth in claim 1, wherein the auxiliary lamp part comprises:
   an auxiliary lamp disposed outside the integrating sphere;
   a lens focusing an output light of the auxiliary lamp;
   an optical transfer unit having one end disposed inside the integrating sphere and transferring the light focused by the lens; and
   an aperture providing directionality to the light output by the optical transfer unit.

5. The integrating sphere photometer as set forth in claim 1, wherein the auxiliary lamp part comprises:
   an auxiliary lamp disposed outside the integrating sphere;
   a lens focusing output light of the auxiliary lamp; and
   an optical transfer unit having one end disposed inside the integrating sphere and transferring the light focused by the lens,
   wherein the auxiliary lamp baffle provides directionality to the light output from the one end of the optical transfer unit.

6. The integrating sphere photometer as set forth in claim 1, wherein the auxiliary lamp part comprises:
   a plurality of additional auxiliary lamp parts disposed at a contact region between the left hemisphere and the right hemisphere.

7. A measuring method of an integrating sphere photometer comprising an integrating sphere including a left hemisphere and a right hemisphere, a photometer disposed on the center surface of the right hemisphere, a photometer baffle disposed in front of the photometer to be spaced apart therefrom, a light source to be tested disposed at the center region of the integrating sphere to illuminate light to at least an illumination region of the left hemisphere, a auxiliary lamp part disposed in the vicinity of a contact region between the left hemisphere and the right hemisphere to illuminate light to the illumination region, and an auxiliary lamp baffle disposed around the auxiliary lamp part to prevent the light emitted from the light source to be tested from being directly illuminated to the auxiliary lamp part and also to prevent the light emitted from the auxiliary lamp part from being directly illuminated to the light source to be tested, the measuring method comprising:
   mounting a reference lamp on the center region of the integrating sphere and lighting the reference lamp to measure incident light by the photometer;
   putting out the light of the reference lamp and lighting the auxiliary lamp part to measure incident light by the photometer;
   removing the reference lamp and mounting and lighting the light source to be tested to measure incident light by the photometer;
   putting out the light of the light source to be tested and lighting the auxiliary lamp part to measure incident light by the photometer; and calculating the total luminous flux of the measuring target light source,
   wherein an outermost region of the region illuminated by the auxiliary lamp part matches the illumination region.

* * * * *